United States Patent [19]

Schuster et al.

[11] Patent Number: 4,732,957
[45] Date of Patent: Mar. 22, 1988

[54] POLYURETHANE-BASED REACTIVE MASS AND ITS USE FOR THE PRODUCTION OF COATINGS

[75] Inventors: Peter Schuster, Mannheim; Rudolf Punessen, Brühl; Karl Nützel, Neulussheim; Richard Kopp; Werner Rasshofer, both of Cologne, all of Fed. Rep. of Germany

[73] Assignee: Bayer Aktiengesellschaft, Leverkusen, Fed. Rep. of Germany

[21] Appl. No.: 839,940

[22] Filed: Mar. 17, 1986

[30] Foreign Application Priority Data

Mar. 30, 1985 [DE] Fed. Rep. of Germany ....... 3511754

[51] Int. Cl.$^4$ .............................................. C08G 18/48
[52] U.S. Cl. ....................................... 528/58; 528/66; 528/67; 528/73; 528/74.5; 528/76; 528/77; 528/83; 427/385.5; 427/393
[58] Field of Search ....................... 528/58, 66, 67, 73, 528/74.5, 76, 77, 83; 427/385.5, 393

[56] References Cited

U.S. PATENT DOCUMENTS 4,038,304 7/1977 Kazama et al. ...................... 528/58
4,588,802 5/1986 Chang ................................. 528/58

*Primary Examiner*—Maurice J. Welsh
*Attorney, Agent, or Firm*—Connolly and Hutz

[57] ABSTRACT

A polyurethane-based reactive mass composed of
(a) at least one organic compound in the molecular weight range of from 400 to 12000 containing isocyanate reactive groups and having a functionality from 2 to 8,
(b) optionally an organic compound in the molecular weight range of from 62 to 399 containing isocyanate reactive groups and having a functionality from 2 to 8.
(c) catalysts,
(d) aliphatic isocyanate compounds and
(e) optionally other auxiliary agents and additives known per se, characterized in that the aliphatic isocyanate compound used is one based on hexamethylene diisocyanate, hydrogenated diphenylmethane diisocyanate or isophorone diisocyanate containing isocyanurate and/or uretdione units and/or urethane and/or uretoneimine and/or oxadiazatrione groups is suitable for the production of lightfast coatings, including coatings in light colors, in particular for the formation of edgings round wooden panels without these panels having first to be dried down to the maximum dampness of 7% by weight.

10 Claims, No Drawings

POLYURETHANE-BASED REACTIVE MASS AND ITS USE FOR THE PRODUCTION OF COATINGS

This invention relates to a polyurethane-based reactive mass consisting of a special aliphatic isocyanate component, a polyol component and the usual additives, and to the use of this reactive mass for the production of coatings used in particular in the furniture industry.

The invention relates in particular to a process for forming edgings round wooden panels, in particular chipboard and plywood panels, using a reactive mass of the kind defined above to produce an edging which is lightfast even in light colours without the wooden panel round which the edging is to be formed having first to be maximally dried down to a moisture content of 7% by weight.

When the wooden panels of furniture are covered at the corners and edges with edging strips or directly coated with plastics, these covers and coatings are liable to become detached by environmental influences and wear and tear. The cut edges of wooden panels produced in various thicknesses and forms and cut to certain dimensions must, however, be sealed for various reasons:

(a) to adapt the cut edge to the design of the surface,
(b) to seal off against moisture since wooden panels readily swell,
(c) to serve as a protection against pieces breaking out of the wooden panels, and
(d) to prevent injury and damage to other bodies knocking against the edge of the wooden panels.

When edging strips or direct coatings become detached from a piece of furniture, the sharp edges produced constitute a source of danger and a health hazard in office, home, school, etc. Although this difficulty can to a large extent be countered by the use of solid wooden edging strips, the application of such strips entails a considerable additional amount of labour and increases the cost of the product to an undesirable extent.

Mechanical processes applied to systems based on polyurethanes have already been proposed as an alternative to solid wood edging (see also Kunststoff-Journal 1982, No.8, page 47). There are two different types of such processes, which are distinguished according to the nature of the wooden panels and the polyurethane systems.

In the first process, the polyurethanes used are prepared from aromatic diisocyanates. These have the advantage that the usual wood moisture content of 8 to 10% by weight obtained by normal dry storage of the cut wooden panel does not interfere with the process of applying the edging strip. The disadvantage of this system, however, is that due to the aromatic diisocyanates, the polyurethane edging produced is not lightfast and therefore can only be offered for use in dark colours.

The second method employs hexamethylene diisocyanate or isophorone diisocyanate and results in lightfast polyurethanes. With this system, therefore, it is possible to produce polyurethane edges which are colourless or light in colour and have no tendency to yellowing. The disadvantages of this system arise from the fact that a more powerful catalytic action is necessary owing to the well-known low reactivity of aliphatic isocyanates, and this catalytic action results in a very short working life as well as enabling side reactions to take place with the moisture content of the wood. This means that only wooden panels which have been maximally dried down to a moisture content of 7% by weight can be satisfactorily treated by this method. A 7% by weight moisture content in wood, however, can only be achieved if suitable drying apparatus are used for the wooden panels.

It is an object of the present invention to prepare a reactive mass based on polyurethanes, which may be satisfactorily used for coating wooden panels, particularly for coating the edges, without the wood having first to be dried to moisture contents below 8 to 10% by weight (usual moisture content of wooden panels). At the same time, the working time is required to be sufficiently long and the dwell time in the mould as short as possible. Lastly, the mass should also be suitable for forming lightfast colourless or light coloured coatings and edges.

It was surprisingly found that these objects could be achieved by using the isocyanate compounds described below.

The present invention thus relates to a polyurethane-based reactive mass composed of (a) at least one organic compound in the molecular weight range of from 400 to 12000 containing isocyanate reactive groups and having a functionality from 2 to 8,
(b) optionally an organic compound in the molecular weight range of from 62 to 399 containing isocyanate reactive groups and having a functionality from 2 to 8,
(c) catalyst,
(d) aliphatic isocyanate compounds and
(e) optionally other auxiliary agents and additives known per se, characterised in that the aliphatic isocyanate compound used is one based on hexamethylene diisocyanate, hydrogenated diphenylmethane diisocyanate or isophorone diisocyanate containing isocyanurate and/or uretdione units and/or urethane and/or uretoneimine and/or oxadiazatrione and/or biuret groups and the catalyst used is preferably a tin catalyst.

The invention further relates to a process using the reactive mass according to the invention for coating surfaces, preferably surfaces of wood or wood by-products such as chipboard and plywood panels.

The cured lightfast coatings not only fulfil the present day requirements of the law and of customers concerning the safety of furniture products but also leave the furniture designer every freedom to adjust the degree of curvature of corners and edges as desired as well as considerably reducing the manufacturing costs compared with those required for applying solid edge strips. Furthermore, the second coatings have satisfactory mechanical properties. They can be adjusted to almost any degree of hardness by varying the compounds put into the process. The material may also be coloured in light colour shades.

100 Parts by weight of component (a) are generally used with 0 to 50 parts by weight of (b), 0.001 to 5 parts by weight of (c) and 10 to 100 parts by weight of (d), preferably 5 to 20 parts by weight of (b), 0.01 to 2.5 parts by weight of (c) and 10 to 50 parts by weight of (d).

The catalyst component (c) may be incorporated both with the isocyanate component and with the polyol component, and (a), (b) and (c) may be used in various proportions to produce either an OH prepolymer, which is subsequently cured with the remaining quantities of isocyanate compound, or an isocyanate prepolymer, which is subsequently cured with the polyol compounds of (a) and/or (b).

The substances used as starting component (a) are compounds having a molecular weight of from 400 to 12000 and containing at least two isocyanate reactive groups.

These may be compounds containing amino groups, thiol groups or carboxyl groups but are preferably compounds containing hydroxyl groups and having a functionality from 2 to 8 and preferably a molecular weight of from 500 to 3000. Examples of such compounds include polyesters, polyethers, polythioethers, polyacetals, polycarbonates and polyester amides containing at least 2, generally 2 to 8, preferably 2 to 4 hydroxyl groups, of the kind known per se for the production of both homogeneous and cellular polyurethanes.

The hydroxyl polyesters used may be, for example, reaction products of polyhydric, preferably dihydric alcohols with polybasic, preferably dibasic carboxylic acids. Instead of using free polycarboxylic acids, the corresponding polycarboxylic acid anhydrides or corresponding polycarboxylic acid esters of low alcohols or mixtures thereof may be used for the preparation of the polyesters. Polycarboxylic acids may be aliphatic, cycloaliphatic, aromatic and/or heterocyclic and may be substituted, e.g. with halogen atoms, and/or unsaturated.

The following are given as examples of such carboxylic acids and their derivatives:

Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerised and trimerised unsaturated fatty acids optionally mixed with monomeric unsaturated fatty acids such as oleic acid; dimethylterephthalate and terephthalic acid-bis-glycol esters. Suitable polyhydric alcohols include, for example, ethylene glycol, propylene glycol-(1,2) and -(1,3), butylene glycol-(1,4) and -(2,3), hexanediol(1,6), octanediol-(1,8), neopentyl glycol, 1,4-bis-hydroxymethylcyclohexane, 2-methyl-1,3-propanediol, glycerol, trimethylol propane, hexanetriol-(1,2,6), butanetriol(1,2,4), trimethylolethane, pentaerythritol, quinitol, mannitol and sorbitol, formitol, methyl glycoside, diethyleneglycol, triethyleneglycol, tetraethyleneglycol and higher polyethyleneglycols, dipropyleneglycol and higher polypropyleneglycols, dibutyleneglycol and higher polybutyleneglycols. The polyesters may contain a proportion of carboxyl end groups. Polyesters of lactones such as ε-caprolactone or of hydroxycarboxylic acids such as ω-hydroxycaproic acid may also be used.

The hydroxylpolyethers which may be used according to the invention contain at least two, generally two to eight, preferably two or three hydroxyl groups and which are also known per se and may be prepared, for example, by the polymerisation of epoxides such as ethylene oxide, propylene oxide, butylene oxide, tetrahydrofuran, styrene oxide or epichlorohydrin, either on their own, e.g. in the presence of Lewis catalysts such as $BF_3$, or by chemical addition of these epoxides, preferably of ethylene oxide and propylene oxide, optionally as mixtures or successively, to starting components containing reactive hydrogen atoms, such as water, alcohols, ammonia or amines, e.g. ethylene glycol, propylene glycol-(1,3) or -(1,2), trimethylolpropane, glycerol, sorbitol, 4,4'-dihydroxy-diphenylpropane, aniline, ethanolamine or ethylene diamine. Sucrose polyethers may also be used according to the invention, e.g. those described in DE-AS Nos. 1 176 358 and 1 064 938, as may also polyethers which have been started on formitol or formose (DE-OS Nos. 2 639 083 and 2 737 951). It is frequently preferred to use polyethers containing predominantly primary OH groups (up to 90% by weight thereof, based on all the OH groups present in the polyether). Polybutadienes containing OH groups are also suitable for the purpose of this invention.

Suitable polythioethers are in particular the condensation products obtained by condensing thiodiglycol on its own and/or with other glycols, dicarboxylic acids, formaldehyde, aminocarboxylic acids or amino alcohols. The products obtained vary according to the cocomponent and may be, for example, polythio mixed ethers, polythio ether esters or polythioether ester amides.

Suitable polyacetals include, for example, the compounds obtainable from glycols such as diethyleneglycol, triethyleneglycol, 4,4'-dioxethoxy-diphenyldimethylmethane, hexanediol and formaldehyde. Polyacetals suitable for the purpose of the invention may also be prepared by the polymerisation of cyclic acetals such as trioxane (DE-OS 1 694 128).

Suitable polycarbonates containing hydroxyl groups are known per se, e.g. those obtainable by the reaction of diols such as propanediol-(1,3), butanediol-(1,4) and/or hexanediol-(1,6), diethyleneglycol, triethyleneglycol, tetraethyleneglycol or thiodiglycol with diaryl carbonates such as diphenyl carbonate or with phosgene (DE-AS Nos. 1 694 080, 1 915 908 and 2 221 751, DE-OS No. 2 605 024).

Suitable polyesteramides and polyamides include, for example, the predominantly linear condensates obtained from polybasic saturated or unsaturated carboxylic acids or their anhydrides and polyvalent saturated or unsaturated amino alcohols, diamines, polyamines and mixtures thereof.

Polyhydroxyl compounds already containing urethane or urea groups and modified and unmodified natural products such as castor oil or carbohydrates such as starch or natural polyols which have been modified by the addition of ketone/formaldehyde condensates, e.g. according to DE-PS No. 1 720 710 may also be used.

Products of the addition of alkylene oxides to phenol-formaldehyde resins or to urea formaldehyde resins may also be used according to the invention.

The polyhydroxyl compounds mentioned above may be modified by various means before they are used in the polyisocyanate polyaddition process. Thus according to DE-OS Nos. 2 210 839 and 2 544 195, a mixture of various polyhydroxyl compounds (e.g. a polyether polyol and a polyester polyol) may be condensed by etherification in the presence of a strong acid to form a relatively high molecular weight polyol composed of different segments connected by ether bridges. Amide groups may be introduced into the polyhydroxyl compounds according to DE-OS No. 2 559 372, for example, and triazine groups may be introduced by a reaction with polyfunctional cyanic acid esters according to DE-OS No. 2 620 487. Polyhydroxyl compounds containing guanidine, phosphonoformamidine or acylurea groups (DE-OS Nos. 2 714 289, 2 714 292 and 2 714 293) may be obtained by reacting a polyol with less than the equivalent quantity of a diisocyanatocarbodiimide and subsequently reacting the carbodiimide group with an amine, amide, phosphite or carboxylic acid.

The compounds which may be used as starting component (a) also include so-called aminopolyethers or aminohydroxypolyethers within the above mentioned molecular weight range in which at least 25 equivalents percent, preferably 50 and most preferably 80 to 100 equivalents percent of the isocyanate reactive end groups consist of primary and/or secondary, aromatically or aliphatically bound amino groups and the remainder consist of primary and/or secondary aliphatically bound hydroxyl groups.

In these compounds, the terminal groups carrying the amino groups may also be linked to the polyether chain by urethane or ester groups. Preparation of these "aminopolyethers" is carried out in known manner. Thus, for example, amination of polyhydroxypolyethers such as polypropylene glycol ethers may be carried out by reaction with ammonia in the presence of Raney nickel and hydrogen (BE-PS No. 634 741). U.S. Pat. No. 3,654,370 describes the preparation of polyoxyalkylenepolyamines by reaction of the corresponding polyol with ammonia and hydrogen in the presence of a nickel, copper or chromium catalyst. DE-PS No. 1 193 671 describes the preparation of polyethers containing amino end groups by the hydrogenation of cyanoethylated polyoxypropylene ethers. Other methods for the preparation of polyoxyalkylene(polyether)amines are described in U.S. Pat. No. 3,155,728, U.S. Pat. No. 3,236,895 and FR-PS No. 1 551 605. FR-PS 1 466 709, for example, describes the preparation of polyethers containing secondary amino end groups.

Relatively high molecular weight polyhydroxypolyethers may be converted into the corresponding anthranilic acid esters suitable for use as component (a) according to the invention by reacting them with isatoic acid anhydride as described, for example, in DE-OS No. 2 019 432, DE-OS No. 2 619 840, U.S. Pat. No. 3,808,250, U.S. Pat. No. 3,975,428 or U.S. Pat. No. 4,016,143. Polyethers containing aromatic amino end groups are obtained by this procedure.

Relatively high molecular weight compounds containing amino end groups are obtained according to DE-OS No. 2 546 536 and U.S. Pat. No. 3,865,791 by the reaction of isocyanate prepolymers based on polyhydroxypolyethers with enamines, aldimines or ketimines containing hydroxyl groups, followed by hydrolysis.

Other aminopolyethers within the above mentioned molecular weight range may also be used, for example those obtained according to DE-OS No. 2 948 419, DE-OS Nos. 3 039 600, 3 112 118, 3 131 252, 3 200 021, 3 144 991 or 3 223 395.

Other methods of preparation for relatively high molecular weight compounds containing amino end groups or hydrazide end groups are described in DE-OS No. 1 694 152.

Polyhydroxyl compounds containing high molecular weight polyadducts or polycondensates or polymers in a finely dispersed or dissolved form may also be used according to the invention. Polyhydroxyl compounds of this kind are obtained, for example, when polyaddition reactions (e.g. reactions between polyisocyanates and amino functional compounds) or polycondensation reactions (e.g. between formaldehyde and phenols and/or amines) are carried out in situ in the above mentioned compounds containing hydroxyl groups. Processes of this kind have been described, for example, in DE-AS Nos. 1 168 075 and 1 260 142 as well as in DE-OS Nos. 2 324 134, 2 423 984, 2 512 385, 2 513 815, 2 550 796, 2 550 797, 2 550 833, 2 550 862, 2 633 293 and 2 639 254. Alternatively, such compounds may be obtained according to U.S. Pat. No. 3,869,413 or DE-OS No. 2 550 860 by mixing a previously prepared aqueous polymer dispersion with a polyhydroxyl compound and then removing the water from the mixture.

Polyhydroxyl compounds modified by vinyl polymers such as may be obtained, for example, by the polymerisation of styrene and acrylonitrile in the presence of polyethers (U.S. Pat. Nos. 3,383,351, 3,304,273, 3,523,093 or 3,110,695 or DE-AS No. 1 152 536) or polycarbonate polyols (DE-PS No. 1 769 795 or U.S. Pat. No. 3,637,909) are also suitable for the process according to the invention. Polyether polyols which have been modified according to DE-OS Nos. 2 442 101, 2 644 922 or 2 646 141 by graft polymerisation with vinyl phosphonic acid esters and optionally (meth)acrylonitrile, (meth)acrylamide or OH functional (meth)acrylic acid esters give rise to synthetic resins with exceptional flame resistance. Polyhydroxyl compounds in which carboxyl groups have been introduced by radical graft polymerisation by means of unsaturated carboxylic acids and optionally other olefinically unsaturated monomers (DE-OS Nos. 2 714 291, 2 739 620 and 2 654 746) may be used to particular advantage in combination with mineral fillers.

Polyamino compounds modified with vinyl polymers and containing amino end groups are obtained according to DE-OS Nos. 3 112 118, 3 200 021, EP-OS No. 84 141 and U.S. Pat. No. 4 286 074.

When modified polyhydroxyl compounds of the type mentioned above are used as starting components in the polyisocyanate polyaddition process, the polyurethane resins obtained in many cases have substantially improved mechanical properties.

Representatives of the above mentioned compounds to be used according to the invention are described, for example, in High Polymers, Vol.XVI, "Polyurethanes, Chemistry and Technology" by Saunders-Frisch, Interscience Publishers, New York, London, Volume I, 1962, pages 32–42 and 44–54 and Volume II, 1964, pages 5–6 and 198–199 and in Kunststoff-Handbuch, Volume VII, Vieweg-Höchtlen, Carl-Hanser-Verlag, Munich, 1966, e.g. on pages 45–71. Mixtures of the above mentioned compounds containing at least two isocyanate reactive hydrogen atoms and having a molecular weight of from 400 to 12000, e.g. mixtures of polyethers and polyesters, may, of course, also be used.

It is particularly advantageous in some cases to use combinations of low melting with high melting polyhydroxyl compounds (DE-OS No. 2 706 297).

The compounds used as isocyanate reactive compounds (a) are advantageously difunctional and trifunctional polyethers within the OH number range of from 20 to 200 obtained by the chemical addition of propylene oxide and/or ethylene oxide to suitable starter molecules or polyethers or polyesters within an OH number range of from 40 to 150 which have been modified by polymers, or natural polyols modified with ketone-formaldehyde condensates.

Compounds which may be used as starting component (b) include compounds in the molecular weight range of from 62 to 399 containing at least two isocyanate reactive hydrogen atoms. These are also understood to include compound containing hydroxyl groups and/or amino groups and/or thiol groups and/or carboxyl groups, preferably hydroxyl groups and/or amino groups, and serve as chain lengthening or cross-linking agents. These compounds generally contain 2 to 8, preferably 2 to 4 isocyanate reactive hydrogen atoms.

These again may be used in the form of mixtures of different compounds containing at least two isocyanate reactive hydrogen atoms and having a molecular weight in the range of from 62 to 399.

The following are given as examples of such compounds: Ethylene glycol, propylene glycol-(1,2) and -(1,3), butylene glycol-(1,4) and -(2,3), pentanediol-(1,5), hexanediol(1,6), octanediol-(1,8), neopentyl glycol, 1,4-bis-hydroxy-methyl-cyclohexane, 2-methyl-1,3-propanediol, dibromobutenediol, glycerol, trimethylolpropane, hexanetriol-(1,2,6), trimethylolethane, pentaerythritol, quinitol, mannitol and sorbitol, castor oil, diethylene glycol, triethylene glycol, tetraethylene glycol, higher polyethylene glycols with a molecular weight of up to 399, dipropylene glycol, higher polypropylene glycols with a molecular weight of up to 399, dibutylene glycol, higher polybutylene glycols with a molecular weight of up to 399, 4,4'-dihydroxydiphenylpropane, dihydroxymethylhydroquinone, ethanolamine, diethanolamine, diisopropanolamine, N-methyldiethanolamine, triethanolamine and 3- and 2-aminopropanol.

The low molecular weight polyols used according to the invention may also be mixtures of hydroxyaldehydes and hydroxyketones ("formoses") and the polyhydric alcohols ("formitol") obtained from them by reduction, such as the compounds which may be obtained from the condensation of formaldehyde hydrate with itself in the presence of metal compounds as catalysts and compounds capable of enediol formation as cocatalysts (DE-OS Nos. 2 639 084, 2 714 084, 2 714 104, 2 721 186, 2 738 154 and 2 738 512). These formoses are advantageously used in combination with aminoplast formers and/or phosphites (DE-OS Nos. 2 738 513 and 2 738 532) for producing synthetic resins with improved flame-resistance. Solutions of polyisocyanate polyaddition products, in particular of polyhydrazodicarbonamides and/or polyurethaneureas containing ionic groups, in low molecular weight, polyhydric alcohols may also be used as polyol components according to the invention (DE-OS No. 2 638 759).

Examples of aliphatic diamines suitable for the purpose of the invention include ethylenediamine, 1,4-tetramethylene diamine, 1,11-undecamethylene diamine, 1,12-dodecamethylene diamine and mixtures thereof, 1-amino-3,3,5-trimethyl-5-aminomethylcyclohexane ("isophorone diamine"), 2,4- and 2,6-hexahydrotolylenediamine and mixtures thereof, perhydro-2,4'- and 4,4'-diaminodiphenylmethane, p-xylylene diamine, bis-(3-aminopropyl)-methylamine, diamino-perhydroanthracenes (DE-OS No. 2 638 731) and cycloaliphatic triamines according to DE-OS No. 2 614 244. Hydrazine and substituted hydrazines such as methyl hydrazine, N,N'-dimethylhydrazine and homologues thereof and acid dihydrazides may also be used according to the invention, e.g. carbodihydrazide and the dihydrazides of oxalic acid, malonic acid, succinic acid, glutaric acid, adipic acid, β-methyladipic acid, sebacic acid, hydracrylic acid and terephthalic acid; semicarbazido-alkylene-hydrazides, e.g. β-semicarbazidopropionic acid hydrazide (DE-OS No. 1 770 591) and semicarbazidoalkylene-carbazic esters, e.g. 2-semicarbazidoethyl-carbazic ester (DE-OS No. 1 918 504) as well as aminosemicarbazide compounds, e.g. β-aminoethylsemicarbazidocarbonate (DE-OS No. 1 902 931). Their reactivity may be controlled by partly or completely blocking the amino groups with aldimine or ketimine groups (U.S. Pat. No. 3,734,894, DE-OS No. 2 637 115).

Compounds such as 1-mercapto-3-aminopropane, amino acids such as glycine, alanine, valine, serine or lysine, and dicarboxylic acids such as succinic acid, adipic acid, phthalic acid, 4-hydroxyphthalic acid and 4-aminophthalic acid may be used as chain lengthening agents according to the invention.

Compounds which are monofunctional in their reaction with isocyanates may be used in proportions of from 0.01 to 10% by weight, based on the polyurethane solids content, to serve as so-called chain terminating agents. Examples of such monofunctional compounds include monoamines such as butylamine and dibutylamine, octylamine, stearylamine, N-methyl-stearylamine, pyrrolidine, piperidine and cyclohexylamine, and monohydric alcohols such as butanol, 2-ethylhexanol, octanol, dodecanol and various amyl alcohols, cyclohexanol and ethylene glycol monoethylether.

The polypols with molecular weights of up to 399 used for the purpose according to the invention may also be ester diols corresponding to the general formulae

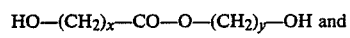
HO—(CH$_2$)$_x$—CO—O—(CH$_2$)$_y$—OH and

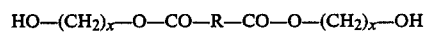
HO—(CH$_2$)$_x$—O—CO—R—CO—O—(CH$_2$)$_x$—OH wherein
R denotes an alkylene group having 1 to 20, preferably 2 to 6 carbon atoms or a cycloalkylene or arylene group with 6 to 10 carbon atoms
x denotes a number from 2 to 6 and
y denotes a number from 3 to 5
e.g. δ-hydroxybutyl-ε-hydroxy-caproic acid ester, ω-hydroxyhexyl-γ-hydroxybutyric acid ester, adipic acid-bis-(β-hydroxyethyl)ester and terephthalic acid-bis-(β-hydroxyethyl)ester; diolurethanes corresponding to the general formula

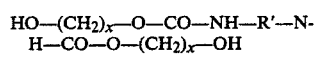
HO—(CH$_2$)$_x$—O—CO—NH—R'—NH—CO—O—(CH$_2$)$_x$—OH wherein
R' denotes an alkylene group having 2 to 15, preferably 2 to 6 carbon atoms or a cycloalkylene or arylene group having 6 to 15 carbon atoms and
x represents a number from 2 to 6, e.g. 1,6-Hexamethylene-bis-(β-hydroxyethylurethane) or 4,4'-diphenylmethane-bis-(δ-hydroxybutylurethane);
and diolureas corresponding to the general formula

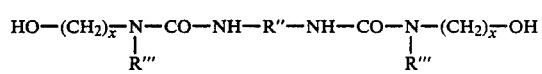
HO—(CH$_2$)$_x$—N—CO—NH—R''—NH—CO—N—(CH$_2$)$_x$—OH
$\quad\quad\quad\quad$ |  $\quad\quad\quad\quad\quad\quad\quad\quad\quad\quad$ |
$\quad\quad\quad\quad$ R'''  $\quad\quad\quad\quad\quad\quad\quad\quad\quad\quad$ R''' wherein
R'' denotes an alkylene group having 2 to 15, preferably 2 to 9 carbon atoms or a cycloalkylene or arylene group having 6 to 15 carbon atoms,
R''' denotes hydrogen or a methyl group and x represents the number 2 or 3, e.g. 4,4'-diphenylmethane-bis-(β-hydroxyethylurea) or the compound corresponding to the formula

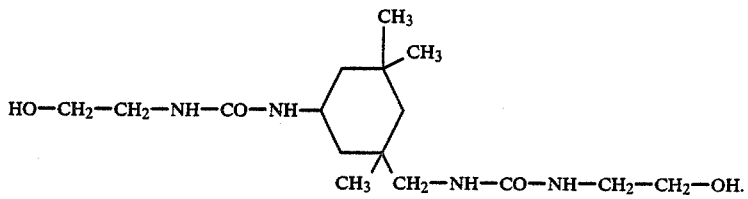

For some purposes, it is advantageous to use polyols containing sulphonate and/or phosphonate groups (DE-OS No. 2 719 372), preferably the adduct of bisulphite with butane-1,4-diol or with its alkoxylation products.

The isocyanate reactive compounds (b) are preferably short chained difunctional or trifunctional polyethers within the OH number range of from 300 to 800 or glycols such as butane-1,4-diol or ethylene glycol.

Catalysts for the isocyanate addition reaction are used as component (c). One of these catalysts is preferably a tin compound, preferably a tin-II compound such as $SnCl_2$, tin dioctoate or a tin-IV compound most preferably a diaryl or dialkyl tin-IV compound such as dimethyl tin dichloride, dimethyl tin sulphide and other dialkyl tin dihalides, dialkyl tin oxides or dialkyl tin sulphides, dialkyl tin-bis-(alkylmercaptides) such as dimethyl tin-bis-(butylmercaptide), dibutyl tin-bis-(octylmercaptide), dioctyl tin-bis-(laurylmercaptide), dimethyl tin-bis-(thioglycollic acid ethyl hexyl ester), dibutyl tin-bis-(thioglycollic acid dodecylester), dialkyl tin monochlorobutanolate and other dialkyl tin monohalogen-monoalcoholates and -phenolates, dialkyl tin-bis-alcoholates such as dimethyl tin-bis-octanolate or dibutyl tin-glycollate and the corresponding dialkyl tin-bis-(thioalcoholates). Dialkyl tin-IV-carboxylate compounds and dialkyl tinmonohalogen compounds such as dimethyl tin-chloro-octoate according to DE-OS No. 3 100 977 and stannoxane and thiostannoxane compounds having a tin-carboxylate structure according to DE-OS No. 3 141 117 are particularly preferred, and especially di-$C_1$-$C_8$-alkyl tin-bis-($C_1$-$C_4$-carboxylic acid-$C_1$-$C_{24}$-alkyl esters) such as dibutyl tin diacetate, dimethyl tin maleate, dibutyl tin dilaurate and dioctyl tin diacetate.

Polyisocyanates containing at least 2, preferably 2 to 3 isocyanate groups may be used as component (d).

The preparation of polyisocyanates containing isocyanurate groups and preferably having isocyanate contents of from 15 to 30% by weight has been described inter alia in DE-PS Nos. 1 022 789, 1 222 067 and 1 027 394 and in DE-OS Nos. 1 929 034 and 2 004 048. Polyisocyanates containing biuret groups have isocyanate contents of from 30 to 15% by weight, preferably from 25 to 20% by weight, and viscosities from 6000 to 500, preferably from 4000 to 1000 mPas at 20° C. and have been described, for example, in DE-PS No. 1 101 394 and DE-OS No. 2 261 065. Polyisocyanates containing urethane groups may be prepared, for example, by reaction of the above mentioned aliphatic or cycloaliphatic diisocyanates, preferably hexamethylene diisocyanate or isophorone diisocyanate, with optionally substituted or modified alkanediols having 2 to 10, preferably 2 to 6 carbon atoms in the alkylene group, such as ethylene oxide, butane-1,4-diol, dipropylene glycol, hexane-1,6-diol and neopentyl glycol as well as hydroxypivalic acid neopentyl glycol and mixtures thereof using a molar ratio of about 2:1.

The equivalent ratio of isocyanate groups to isocyanate reactive groups, the so-called isocyanate index, may have a value from 70 to 130, preferably from 95 to 110, most preferably from 100 to 105 although the process could be carried out with an isocyanate index above 130, for example if trimerisation catalysts such as alkali metal acetates are used at the same time to trimerise the excess isocyanate groups with isocyanurate formation.

By "isocyanate index" is meant in this context the ratio of NCO groups to all the isocyanate reactive groups present in the reaction mixture. An isocyanate index of 100 denotes in this connection the presence of equivalent quantities of isocyanate groups and isocyanate reactive groups.

Particularly preferred are aliphatic polyisocyanates modified by uretdione groups, so-called "dimeric" isocyanates as described, for example, in DE-OS No. 1 670 720, DE-AS No. 3 030 513, DE-OS No. 3 227 779 or in Urethane Chemistry and Technology by Saunders/Frisch, Part I, page 61 et seq (1982) and/or aliphatic polyisocyanates containing isocyanurate groups, so-called "trimeric" isocyanates, and/or polyisocyanates containing oxadiazatrione groups obtainable e.g. according to U.S. Pat. No. 3 748 329.

The isocyanate content of isocyanates suitable for the purpose of the invention is about 3 to 35, preferably 10 to 30, most preferably 15 to 25% by weight.

The known auxiliary agents and additives used in polyurethane chemistry may be used as component (e) in the processes according to the invention.

For example, blowing agents such as acetone, ethyl acetate and in particular halogenated alkanes such as dichloromethane, trichloromethane, monofluorotrichloromethane, chlorodifluoromethane or dichlorodifluoromethane may be used. Water may also be used.

Other catalysts for the isocyanate polyaddition reaction may be used in addition to the preferred tin compounds if special purposes are to be achieved, e.g. tertiary amines such as N-ethyl-morpholine, N,N,N',N'-tetramethyl-ethylenediamine, pentamethyl-diethylenetriamine and higher homologues (DE-OS No. 2 624 527 and 2 624 528), 1,4-diazabicyclo-(2,2,2)-octane, N-methyl-N'-dimethylaminoethylpiperazine, bis-(dimethylaminoalkyl)-piperazines (DE-OS No. 2 636 787), N,N-dimethyl-benzylamine, bis-(N,N-diethylaminoethyl)adipate, N,N,N',N'-tetramethyl-1,4-butanediamine, N,N-dimethyl-β-phenylethylamine, 1,2-dimethylimidazole, 2-methylimidazole and monocyclic and bicyclic amidines (DE-OS Nos. 1 720 633, 2 722 514 and 2 439 550), aminoalkylethers according to DE-OS No. 3 140 633 and EP-OS No. 54 219, ortho-carboxylic acid esters according to DE-OS No. 2 922 967, bis-(dialkylamino)alkyl ethers (U.S. Pat. No. 3,330,782, DE-AS No. 1 030 558, DE-OS No. 1 804 361 and 2 618 280) and tertiary amines containing amide groups (preferably formamide groups) according to DE-OS No. 2 523 633 and 2 732 292. The known Mannich bases of secondary amines such as dimethylamine and aldehydes, preferably formaldehyde, or ketones such as acetone, methyl ethyl ketone or cyclohexanone and phenols such as phenol, nonylphenol or bisphenol may also be used as catalysts.

Examples of tertiary amines containing isocyanate reactive hydrogen atoms suitable for use as catalysts include triethanolamine, triisopropanolamine, N-methyldiethanolamine, N-ethyl-diethanolamine, N,N-dimethylethanolamine and their reaction products with alkylene oxides such as propylene oxide and/or ethylene oxide as well as secondary-tertiary amines according to DE-OS No. 2 732 292.

Silamines having carbon-silicon bonds may also be used as catalysts, e.g. the compounds described in DE-PS No. 1 229 290, e.g. 2,2,4-trimethyl-2-silamorpholine and 1,3-diethylaminomethyl-tetramethyldisiloxane.

Nitrogen-containing bases such as tetraalkylammonium hydroxides, alkali metal hydroxides such as sodium hydroxide, alkali metal phenolates such as sodium phenolate and alkali metal alcoholates such as sodium methylate may also be used as catalysts. Hexahydrotriazines (DE-OS No. 1 769 043) and carboxylates, e.g. according to EP-OS No. 7 440 and EP-OS No. 56 158 are also suitable catalysts.

The following may be used as cocatalysts: Bismuth catalysts according to DE-OS No. 3 008 811 and U.S. Pat. No. 3,407,153, lead compounds according to DE-OS No. 2 710 901 and U.S. Pat. No. 3,474,075, antimony compounds e.g. according to U.S. Pat. No. 3,245,958, U.S. Pat. No. 3,245,957, U.S. Pat. No. 3,620,985, U.S. Pat. No. 3,109,853, U.S. Pat. No. 3,407,153, and U.S. Pat. No. 3,876,567, zinc salts, e.g. according to GB-PS No. 980,139, zirconium salts, e.g. according to U.S. Pat. No. 4,312,971, mercury compounds, e.g. according to U.S. Pat. No. 4,312,971, DE-OS No. 2 021 757 and DE-AS No. 1 520 305, and compounds of other metals such as Co, Ni, Fe, V, Mo, Ti, Wo and B, e.g. according to EP-OS No. 59 632, U.S. Pat. No. 3,808,162 and FR-PS No. 2 301 554.

The reaction between isocyanate groups and Zerewitin-off-active hydrogen atoms is also highly accelerated by lactams and azalactams with the initial formation of an association between the lactam and the compound containing acidic hydrogen. Such associations and their catalytic action are described in DE-OS Nos. 2 062 286, 2 062 289, 2 117 576, 2 129 198, 2 330 175 and 2 330 211.

All the catalysts mentioned above may, of course, be used as mixtures. Combinations of organic metal compounds with amidines, aminopyridines or hydrazinopyridines are of particular interest (DE-OS Nos. 2 434 185, 2 601 082 and 2 603 834).

Other examples of catalysts and details concerning the activity of the catalysts are described in Kunststoff-Handbuch, Volume VII, published by Vieweg and Höchtlen, Carl-Hanser-Verlag, Munich 1966, e.g. on pages 96 to 102.

The catalysts are generally used in a quantity of about 0.001 to 10% by weight, based on the total quantity of compounds containing at least two isocyanate reactive hydrogen atoms.

The compositions according to the invention may also contain surface active additives, internal mould release agents, UV stabilizers, thermostabilizers, antiozonates and antioxidants.

Examples of auxiliary agents and additives optionally used according to the invention, i.e. of surface-active additives and foam stabilizers, flame-retarding substances, plasticizers, inorganic and organic dyes, pigments and fillers, and fungistatic and bacteriostatic substances and details concerning the use and mode of action of these additives are given in Kunststoff-Handbuch, Volume VII, published by Vieweg and Höchtlen, Carl-Hanser-Verlag, Munich 1966, e.g. on pages 103–113.

External and internal mould release agents known per se may also be used in the process according to the invention, the "external mould release agents" being mainly waxes or metal soaps whereas the "internal mould release agents" used may be those described in U.S. Pat. No. 3,726,952, GB-PS No. 1 365 215, DE-OS No. 2 356 692, DE-OS No. 2 363 452, DE-OS No. 2 404 310, DE-OS No. 2 427 273, DE-OS No. 2 431 968 and GB-PS No. 1 420 293.

In the process according to the invention, the components are reacted together by the known one-shot process, the prepolymer process or the so-called semi-prepolymer process, in many cases using mechanical devices such as those described in U.S. Pat. No. 2,764,565. Details concerning processing apparatus which are also suitable for the purpose of the invention are given in Kunststoff-Handbuch, Volume VII, published by Vieweg and Höchtien, Carl-Hanser-Verlag, Munich 1966, e.g. on pages 121 to 205.

The coating compound according to the invention may be worked up to form solid or cellular foam structures. If foams with a density below about 1 g/cm$^3$ are to be produced, the process according to the invention is carried out in closed moulds, using so-called blowing agents. The reaction mixture is introduced into a mould which may be made of a metal such as aluminium or a synthetic resin, e.g. an epoxide resin. The reaction mixture foams up inside the mould to form the moulded article. In the process according to the invention, the foamable reaction mixture is generally introduced into the mould in such a quantity that if left to foam freely it would expand to a volume which is greater than the internal volume of the mould and preferably amounts to 120 to 1000% of the volume of the mould. This procedure is known as "overcharging" which has been disclosed, for example, in U.S. Pat. No. 3,178,490 and in U.S. Pat. No. 3,182,104.

The process may be used to produce flexible, semi-rigid or rigid moulded foams with a dense outer skin, cellular core and integral density distribution, that is to say a continuous increase in density from the centre of the moulded product to the outside. The rigidity of the products obtained by the process according to the invention depends primarily on the functionality and chain length of the starting materials used for the process according to the invention, i.e. the degree of branching of the starting materials. The process according to the invention is preferably used for the production of rigid moulded foams.

Rigid products obtained by the process may be used for the manufacture of furniture parts, car body parts, technical apparatus and instruments and structural elements, and semi-rigid to flexible products may be used for the manufacture of safety cushioning in the construction of motor vehicles, elastic shoe soles, car bumpers, etc.

The preferred use of the reactive masses according to the invention, however, is that of mechanically edging wooden panels with foamed or preferably solid edgings or borders for the furniture industry. Processing may suitably be carried out by mixing the isocyanate component (containing iosocyanate compound and optionally auxiliary agents and additives) and the polyol component (containing polyol and cross-linking component, preferably the catalyst and optionally auxiliary agents and additives) mechanically by means of a two-component mixing head and discharging the mixture into a heated mould.

A so-called "open process" may be employed, in which case the furniture part (table-top, part of drawer, etc.) which is to be covered round the edge is placed with its undersurface facing upwards into a horizontal aluminium mould heated to 50° to 70° C. and fixed in the mould, and the space left in the mould is filled with reactive mass which is left to harden.

In the "closed process", the panel which is to be coated is also inserted and fixed in a mould but the mould cavity with the part inserted therein is then closed with a suitable lid and substantially sealed off. Reactive coating material can then be forced under pressure into the completely closed gap between the wall of the mould and the inserted panel.

The moulding compounds may be transported and injected by means of low pressure machines capable of operating with open and closed moulds. The conveyor devices may be, for example, gear wheel pumps or immersion piston pumps of the usual construction. Static mixers suffice as mixing devices. The temperature of the components is generally in the region of 15° to 40° C., preferably 20° to 25° C., and the temperature of the mould is generally 40° to 70° C., preferably 50° to 60° C. The time required for filling the mould is generally 1 to 3 minutes. When the reaction systems according to the invention are used, the product can be removed from the mould generally 3 to 5 minutes after the filling process has been completed.

The high pressure machines may be mixing and conveyor installations equipped with a suitable mixing head and having conveyor devices equipped with (stroke) piston pumps. The temperature of the components is generally 15° to 45° C., preferably 25° to 35° C., and the temperature of the mould is generally 40° to 80° C., preferably 50° to 60° C. The product can be removed from the mould 3 to 5 minutes after completion of the filling process.

Cured coatings produced from the masses according to the invention are lightfast and resistant to moisture and temperature (assuming normal use and environmental conditions). They are resistant to solvents and chemicals. They adhere extremely firmly and closely not only to the surface of any form of edge on wooden material but also to surfaces, if necessary pretreated, of other materials, e.g. plastics or synthetic resins, of any dimensions.

GENERAL EXPERIMENTAL CONDITIONS

The polyol component and the polyisocyanate component are prepared separately by mixing the individual components mentioned in the experimental examples and if necessary degasified at 200 mm Hg. After they have been adjusted to a temperature of 30° C., the polyol component and polyisocyanate component are introduced within about 10 to 20 seconds by means of a high pressure piston pump, e.g. HK 135 of Hennecke, in the given proportions (always maintaining an isocyanate index of 106, i.e. equivalents NCO:OH=1.06:1) into a closed mould adjusted to about 50° to 60° C. in which the wooden part which is to be covered on its edges has already been placed in the correct position. After expiry of the dwell time (2 to 3 minutes unless otherwise indicated), the wooden part with the edging cast on it can be removed from the mould.

The mechanical properties determined for a particular system on separately prepared test samples are indicated in some experimental examples.

Polyol component I

Trifunctional polyether obtained by the addition of 86.5% by weight of propylene oxide and 13.5% by weight of ethylene oxide to trimethylolpropane; OH number 35, molecular weight 4800.

Polyol component II

Difunctional polyether obtained by the addition of 87% by weight of propylene oxide and 13% by weight of ethylene oxide to propylene glycol; OH number 28, molecular weight 4000.

Polyol component III

Transesterification product of castor oil and a condensation product of cyclohexanone and formaldehyde; OH number about 165.

Polyol component IV

50% Paste of a zeolite having a nominal pore size of 4 Å in castor oil.

Polyol component V

ZnO paste in a polyether polyol, OH number 17.

Polyol component VI

33% Solution of triethylene diamine in dipropylene glycol.

Polyol component VII

Castor oil, OH number 160.

Polyol component VIII

Trifunctional polyether obtained by the addition of propylene oxide to trimethylolpropane, OH number 370.

Polyol component IX

Polymer polyol prepared by grafting 80 parts by weight of a trifunctional polyether with OH number 35 (obtained by the addition of 83% by weight of propylene oxide and 17% by weight of ethylene oxide to trimethylolpropane) with 20 parts by weight of a monomer mixture of 60% by weight of acrylonitrile and 40% by weight of styrene.

Polyol component X

Polyester of adipic acid and butane-1,4-diol/ethylene glycol in proportions by weight of 1.44:1; OH number 55.

Polyisocyanate component I

Semiprepolymer of isophorone diisocyanate and a propoxylation product of trimethylolpropane with OH number 550; 33% by weight NCO.

Polyisocyanate component II

Semiprepolymer of isophorone diisocyanate and an adduct of glycerol and propylene oxide, OH number 670; 29.0 to 29.3% by weight NCO.

Polyisocyanate component III

Trimer based on hexamethylene diisocyanate with a high proportion of hexamethylene diisocyanate-uretdione, about 22% by weight NCO.

Polyisocyanate component IV

Aliphatic, heterocyclic diisocyanate obtained by the reaction of 2 mol of hexamethylene diisocyanate with 1 mol of $CO_2$, about 22% by weight NCO.

Polyisocyanate component V

Prepolymer of 2 mol of hexamethylene diisocyanate and 1 mol of dipropylene glycol, 14.0% by weight NCO.

EXAMPLE 1

| | |
|---|---|
| Polyol: | 45.75 parts by weight of polyol component I |
| | 47.75 parts by weight of polyol component II |
| | 8.50 parts by weight of butane-1,4-diol |
| | 5.00 parts by weight of polyol component IV |
| | 4.00 parts by weight of polyol component V |
| Polyisocyanate: | Mixture of polyisocyanate components II and IV in proportions by weight in the range of 3:1 to 1:3 |
| Catalysis: | 0.9% by weight of dibutyl tin diacetate in the polyol |
| Processing: | 100 parts by weight of polyol + polyisocyanate corresponding to an isocyanate index of 106 (equivalent ratio NCO:OH groups = 1.06:1) |
| Result: | Very slight gas formation, short dwell time in the mould. |

EXAMPLE 2

| | |
|---|---|
| Polyol: | See Example 1 |
| Polyisocyanate: | Polyisocyanate component II |
| Catalysis: | (a) 0.6% by weight of dibutyl tin dilaurate in the polyisocyanate |
| | (b) 0.7% by weight of diazabicycloundecene in the polyol and 0.6% by weight of dibutyl tin dilaurate in the polyisocyanate |
| Processing: | 100 Parts by weight of polyol + 37.5 parts by weight of polyisocyanate (corresponding to index 106) |
| Results: | (a) Firm adherence to chipboard panels, slight gas formation |
| | (b) More vigorous gas formation, removable from the mould after 5 minutes |

Technical data:

| | |
|---|---|
| DIN 53 505 Shore hardness A | 65 |
| DIN 53 455 Tensile strength (MPa) | 4.3 |
| DIN 53 455 Loading at 100% elongation (MPa) | 2.6 |
| DIN 53 455 Elongation at break (%) | 200 |
| DIN 53 515 Tear propagation resistance (N/mm) | 10.5 |
| DIN 53 516 Abrasion (mm$^3$) | 380 |
| DIN 53 516 Density 20° C. (g/cm$^3$) | 1.05 |
| DIN 53 517 Pressure deformation residue, 70° C. 24 h, 25% D, (%) | 10 |
| DIN 53 512 Elasticity (%) | 33 |

EXAMPLE 3

| | |
|---|---|
| Polyol: | see Example 1 |
| Polyisocyanate: | Polyisocyanate component I |
| Catalysis: | (a) 0.6% by weight of dibutyl tin dilaurate in the polyisocyanate |
| | (b) 0.7% by weight of diazabicycloundecene in the polyol and 0.6% by weight of dibutyl tin dilaurate in the polyisocyanate |
| Processing: | 100 parts by weight of polyol + 33 parts by weight of polyisocyanate (corresponds to isocyanate index 106) |
| Results: | (a) Firm adherence to chipboard panels, no gas formation at the panel, dwell time in the mould more than 20 minutes |
| | (b) gas formation on the chipboard panel, removable from the mould after 5 minutes |

Technical data:

| | |
|---|---|
| Shore hardness A | 58 |
| Tensile strength (MPa) | 4.2 |
| Loading at 100% elongation (MPa) | 1.9 |
| Elongation at break (%) | 270 |
| Tear propagation resistance (N/mm) | 10.4 |
| Abrasion (mm$^3$) | 380 |
| Density 20° C. (g/cm$^3$) | 1.05 |
| Pressure deformation residue, 70° C., 24 h, 25% D, (%) | 12 |
| Elasticity (%) | 36 |

EXAMPLE 4

| | |
|---|---|
| Polyol: | 90 parts by weight of polyol component VII |
| | 10 parts by weight of polyol component VIII |
| | 4 parts by weight of polyol component V |
| | 5 parts by weight of polyol component IV |
| Polyisocyanate: | 25 parts by weight of polyisocyanate component IV |
| | 75 parts by weight of polyisocyanate component III |
| Catalysis: | 0.8% by weight of dibutyl tin diacetate in the polyol |
| Processing: | corresponding to isocyanate index 106 |
| Results: | Slight gas formation on the chipboard panel, medium dwell time in the mould |

EXAMPLE 5

| | |
|---|---|
| Polyol: | see Example 4 |
| Polyisocyanate: | Polyisocyanate component I |
| Catalysis: | 0.9% by weight of dibutyl tin diacetate in the polyol |
| Processing: | corresponding to isocyanate index 106 |
| Results: | Slight gas formation, medium dwell time of 10 to 12 minutes in the mould. |

EXAMPLE 6

| | |
|---|---|
| Polyol: | 95.0 parts by weight of polyol component III |
| | 5.0 parts by weight of butane-1,4-diol |
| | 5.0 parts by weight of polyol component IV |
| | 4.0 parts by weight of polyol component V |
| | 0.6 parts by weight of dibutyl tin diacetate |
| Polyisocyanate: | see Example 4 |
| Processing: | 100 parts by weight of polyol + 71 parts by weight of polyisocyanate |
| Results: | No foam formation, brief dwell time in the mould |

Technical data:

| | |
|---|---|
| Shore hardness A | 68 |
| Shore hardness D | 20 |
| Lightfastness grade | 7 |
| Tensile strength (MPa) | 3.8 |

| | |
|---|---|
| Loading at 100% elongation (MPa) | 3.3 |
| Elongation at break (%) | 150 |
| Density 20° C. (g/cm³) | 1.09 |
| Elasticity (%) | 5 |
| Tear propagation resistance (N/mm) | 7.3 |

EXAMPLE 7

| | |
|---|---|
| Polyol: | 95.0 parts by weight of polyol component III |
| | 5.0 parts by weight of butane-1,4-diol |
| | 5.0 parts by weight of polyol component IV |
| | 4.0 parts by weight of polyol component V |
| Polyisocyanate: | Polyisocyanate component V |
| Catalysis: | 0.8% by weight of dibutyl tin diacetate in the polyol |
| Processing: | Isocyanate index 106 |
| Results: | Slight gas formation at the chipboard panel, medium dwell time in the mould of about 10 minutes |

EXAMPLE 8

| | |
|---|---|
| Polyol: | see Example 7 |
| Polyisocyanate: | Polyisocyanate component I |
| Catalysis: | 0.8% by weight of dibutyl tin diacetate in the polyol |
| Processing: | Isocyanate index 106 |
| Results: | Slight gas formation on the chipboard panel, long dwell time in the mould, above 15 min. |

EXAMPLE 9

| | |
|---|---|
| Polyol: | 46.0 parts by weight of polyol component IX |
| | 46.0 parts by weight of polyol component II |
| | 8.0 parts by weight of butane-1,4-diol |
| | 5.0 parts by weight of polyol component IV |
| | 4.0 parts by weight of polyol component V |
| Polyisocyanate: | see Example 4 |
| Catalysis: | 0.8% by weight of dibutyl tin diacetate in the polyol |
| Processing: | corresponding to an isocyanate index of 106 |
| Results: | very slight foaming, medium dwell time in the mould of 10 minutes |

EXAMPLE 10

| | |
|---|---|
| Polyol: | 95 parts by weight of polyol component X |
| | 5 parts by weight of ethylene glycol |
| | 4 parts by weight of polyol component V |
| | 5 parts by weight of polyol component IV |
| Polyisocyanate: | see Example 4 |
| Catalysis: | 0.9% by weight of dibutyl tin diacetate in the polyol |
| Processing: | corresponding to an isocyanate index of 106 |
| Results: | slight gas formation, medium dwell time in the mould, 10 to 12 minutes. |

What is claimed is:

1. Reactive polyurethane mass comprising
   (i) and isocyanate reactive organic compound selected from the group consisting of difunctional and trifunctional polyethers having OH numbers of from 20 to 200 obtained by the chemical addition of ethylene oxide, propylene oxide or mixtures thereof to suitable starter molecules or polyesters or polyesters having an OH number of from 40 to 150 which are modified by polymers or natural polyols modified with ketone from aldehyde condensates,
   (ii) a tin catalyst,
   (iii) an aliphatic isocyanate compound selected from the group consisting of trimers based on hexamethylene diisocyanate, reaction products of 2 moles hexamethylene diisocanate and 1 mole carbon dioxide, reaction products of 2 moles hexamethylene diisocyanate and 1 mole of dipropylene glycol.

2. Mass according to claim 1, characterised in that the tin catalyst is a dialkyl tin-IV compound.

3. Mass according to claim 1, characterised in that the tin catalyst is a dialkyl tin-bis-ester compound with an organic monocarboxylic acid.

4. Mass according to claim 1, characterised in that the tin catalyst is a di-$C_1$–$C_8$-alkyl-tin-bis-($C_1$–$C_4$-carboxylic acid)-$C_1$–$C_{24}$-alkyl ester.

5. Mass according to claim 1, characterised in that (iii) is a mixture of isocyanate compounds based on hexamethylene diisocyanate, which compounds in addition to containing isocyanate groups also contain isocyanurate and uretdione groups.

6. Mass according to claim 1, characterised in that the component used as (iii) is a mixture of 0 to 100% by weight of trimeric hexamethylene diisocyanate containing isocyanurate groups and 100 to 0% by weight of dimeric hexamethylene diisocyanate containing uretdione groups and 0 to 50% by weight of an adduct of 2 mols of hexamethylenediisocyanate and 1 mol of $CO_2$.

7. Process for coating substrates, characterised in that a mass according to claim 1 is used as coating material.

8. Process for covering the edges of wooden panels, characterised in that a mass according to claim 1 covers said edges.

9. Reactive polyurethane mass according to claim 1 which additionally comprises an organic compound containing 2 to 8 isocyanate reactive groups and having an average molecular weight of from 62 to 399.

10. Reactive polyurethane mass according to claim 1 which comprises for each 100 parts by weight of component (i) the following:
    0 to 50 parts by weight of an organic compound containing 2 to 8 isocyanate reactive groups and having an average molecular weight of from 62 to 399;
    0.001 to 5 parts by weight of tin catalyst (ii);
    and 10 to 100 parts by weight of component (iii).

* * * * *